(12) United States Patent
Fidh (10) Patent No.: US 10,919,366 B2
(45) Date of Patent: Feb. 16, 2021

(54) MULTI-ADJUSTABLE AIR REGISTER

(71) Applicant: Ford Global Technologies, LLC, Dearborn, MI (US)

(72) Inventor: Steven Nicholas Fidh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 707 days.

(21) Appl. No.: 15/677,192

(22) Filed: Aug. 15, 2017

(65) Prior Publication Data

US 2019/0054804 A1 Feb. 21, 2019

(51) Int. Cl.
*B60H 1/34* (2006.01)
*F24F 13/08* (2006.01)

(52) U.S. Cl.
CPC ......... *B60H 1/3435* (2013.01); *B60H 1/3428* (2013.01); *F24F 13/082* (2013.01); *B60H 2001/3464* (2013.01)

(58) Field of Classification Search
CPC ............... B60H 1/3435; B60H 1/3428; B60H 2001/3464; B60H 1/3414; F24F 13/082; B64D 2013/003
USPC ...................................................... 454/152
See application file for complete search history.

(56) References Cited

U.S. PATENT DOCUMENTS

| | | | |
|---|---|---|---|
| 3,572,233 A | | 3/1971 | Bar et al. |
| 4,377,107 A | * | 3/1983 | Izumi .................. B60H 1/3428 454/155 |
| 4,716,818 A | * | 1/1988 | Brown ................... F24F 13/10 251/252 |
| 5,036,753 A | | 8/1991 | Ostrand et al. |
| 6,159,092 A | | 12/2000 | Elder |
| 6,800,023 B2 | | 10/2004 | Demerath |
| 6,881,139 B2 | | 4/2005 | Yang |
| 7,575,510 B2 | | 8/2009 | Kim |
| 9,341,386 B2 | | 5/2016 | Brinas |
| 2004/0092225 A1 | | 5/2004 | Gehring et al. |
| 2015/0174989 A1 | * | 6/2015 | Oe ........................ F24F 13/14 454/152 |

FOREIGN PATENT DOCUMENTS

| | | | | |
|---|---|---|---|---|
| DE | 102008059736 A1 | * | 7/2009 | ........... B60H 1/3428 |
| GB | 1365681 A | * | 9/1974 | ........... B60H 1/3435 |

* cited by examiner

*Primary Examiner* — Steven B McAllister
*Assistant Examiner* — Charles R Brawner
(74) *Attorney, Agent, or Firm* — David Coppiellie; Price Heneveld LLP (57) ABSTRACT

An air register for use in a vehicle includes a vent housing having an outlet. A frame member is operably coupled to the sidewalls of the outlet and contains a perimeter wall framing an open central portion. Disposed within the open central portion is a plurality of chambers operably coupled to the frame member and movable between first and second positions. Each chamber includes a perimeter wall having vertical and horizontal surfaces disposed in a common plane around an open interior portion.

17 Claims, 8 Drawing Sheets

MULTI-ADJUSTABLE AIR REGISTER

FIELD OF THE INVENTION

The present disclosure generally relates to an air register for use in a vehicle. More specifically, the present disclosure relates to an air register that utilizes open chambers to maximize air flow into a vehicle cabin.

BACKGROUND OF THE INVENTION

Numerous variations of air registers for directing air throughout the cabin of a vehicle are currently in use. Traditionally, air registers utilize sets of vanes to direct the air flow throughout the cabin. The air registers may be distributed along the dashboard or instrument panel at the front of the vehicle cabin. Users expect the use of these air registers to be intuitive and easy, and it is expected that the air registers will allow the air flow into the cabin to be adjusted side-to-side and/or up and down. However, the vanes currently used to direct airflow tend to restrict the air flow to some degree and may not effectively direct the air flow, lessening the effectiveness of the air register. These vanes may also contain glass filler materials and may require more expensive materials to achieve stiffness.

SUMMARY OF THE INVENTION

One aspect of the present invention includes an air register. The air register includes a vent housing having an outlet and a frame member operably coupled to the outlet and having a perimeter wall disposed around an open central portion. The air register also includes a plurality of chambers operably couple to the frame member and movable between first and second positions. The chambers each include a perimeter wall having vertical and horizontal surfaces disposed in a common plane around an open interior portion.

Embodiments of the first aspect of the present disclosure can include any one or a combination of the following features:
  the frame member is pivotally coupled to the outlet between first and second positions;
  the plurality of chambers are disposed within an open central portion of the frame;
  the perimeter wall of the frame member is disposed in the same plane as the vertical and horizontal surfaces of the plurality of chambers;
  the perimeter wall of the frame member includes upper and lower portions;
  the upper and lower portions of the perimeter wall of the frame member include a plurality of receiving wells; and
  the plurality of chambers include outwardly extending attachment features received in one of the receiving wells disposed on an upper and lower portions of the perimeter wall of the frame member.

Another aspect of the invention includes a vent housing having an outlet with first and second spaced-apart sidewalls. A frame member is operably coupled to the first and second sidewalls of the outlet. A plurality of chambers is operably coupled to the frame member and movable between first and second positions. Each chamber includes a perimeter wall having vertical and horizontal surfaces disposed in a common plane around an open interior portion.

Embodiments of the second aspect of the present disclosure can include any one or a combination of the following features:
  the frame member pivots about a first axis between first and second positions;
  the frame member surrounds an open central space and wherein the chambers are disposed within the open central portion;
  each chamber of the plurality of chambers pivots along an individual axis that is disposed in a perpendicular orientation relative to the first axis of the frame member;
  a stringer member operably coupled to a first attachment post disposed on each chamber of the plurality of chambers;
  a handle member coupled to and outwardly extending form the plurality of chambers; and
  each chamber of the plurality of chambers further includes a second attachment post received in an associated receiving well disposed on the frame member.

Yet another aspect of the invention includes an air register. The air register includes a vent housing having an outlet. A frame member is pivotally coupled to the outlet and has upper and lower portions. The air register also includes at least one chamber assembly having an upper chamber operably coupled to the upper portion of the frame member and a lower chamber operably couple to the lower portion of the frame member.

Embodiments of the third aspect of the present disclosure can include any one or a combination of the following features:
  the at least one chamber assembly includes a plurality of chamber assemblies;
  the plurality of chamber assemblies includes a central chamber assembly and first and second side chamber assemblies disposed on opposite sides of the central chamber assembly, and wherein the central chamber assembly and the first and second chamber assemblies are defined by perimeter walls having horizontal and vertical surfaces disposed within a common plane;
  each chamber assembly of the plurality of chamber assemblies is interconnected by a stringer member that is pivotally coupled to first attachment posts outwardly extending from each chamber assembly;
  the central chamber assembly includes a handle member disposed between the upper and lower chambers of the central assembly; and
  the frame member rotates from the outlet along a primary rotational axis between first and second positions, and further wherein each of the chamber assembly of the plurality of chamber assemblies includes a secondary rotational axis that is perpendicular to the primary rotational axis, and further wherein the secondary rotational axes are parallel to one another.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2A:
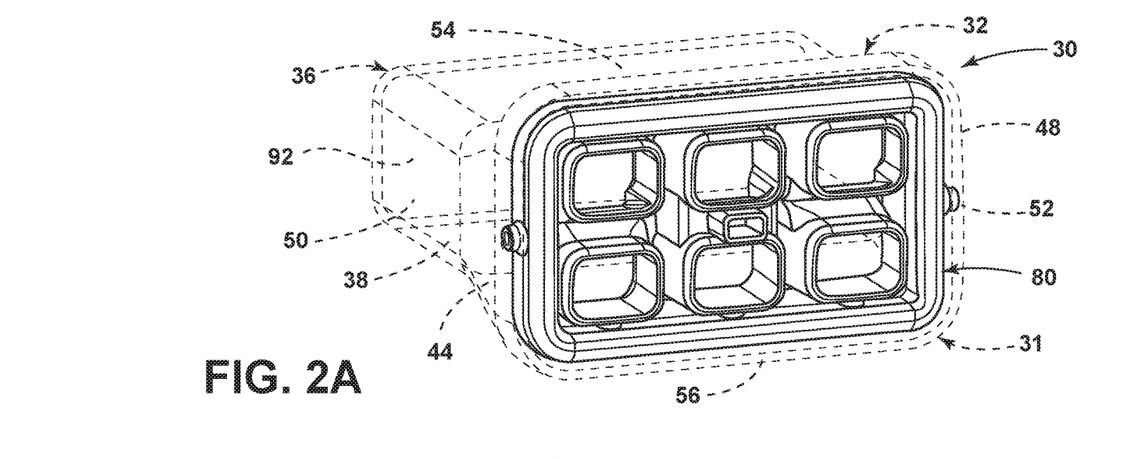
FIG. 2A is a front perspective view of an air register with a vent housing shown in phantom.
Figure 2B:
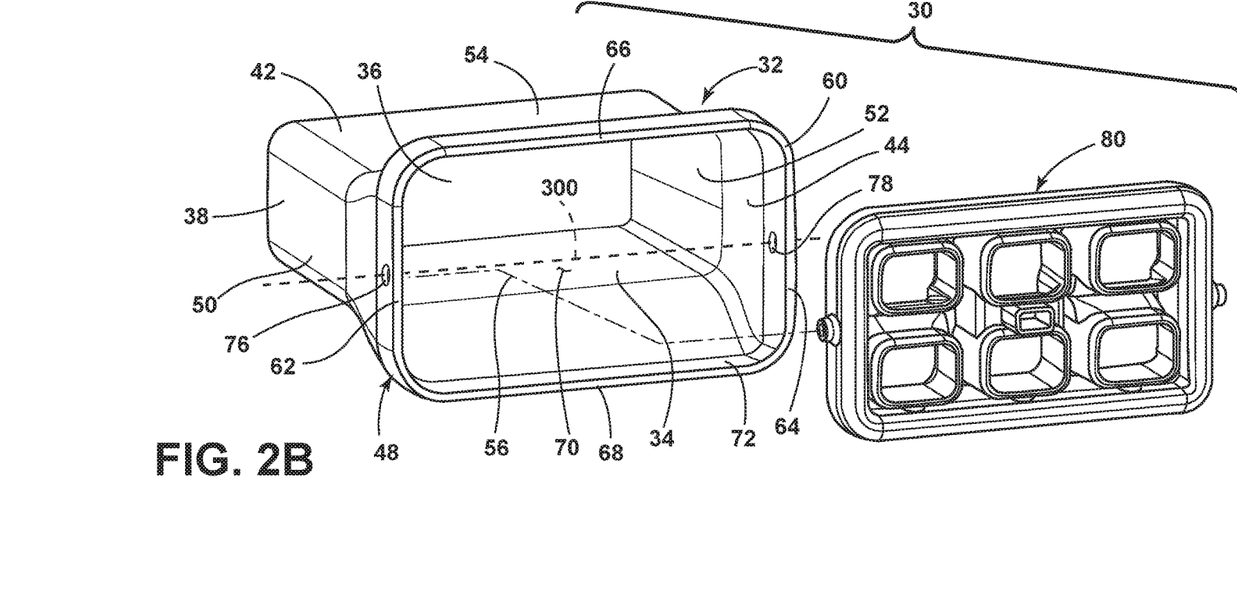
FIG. 2B is an exploded front perspective view of the air register of FIG. 2A showing a frame member exploded away from the vent housing.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle air register. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
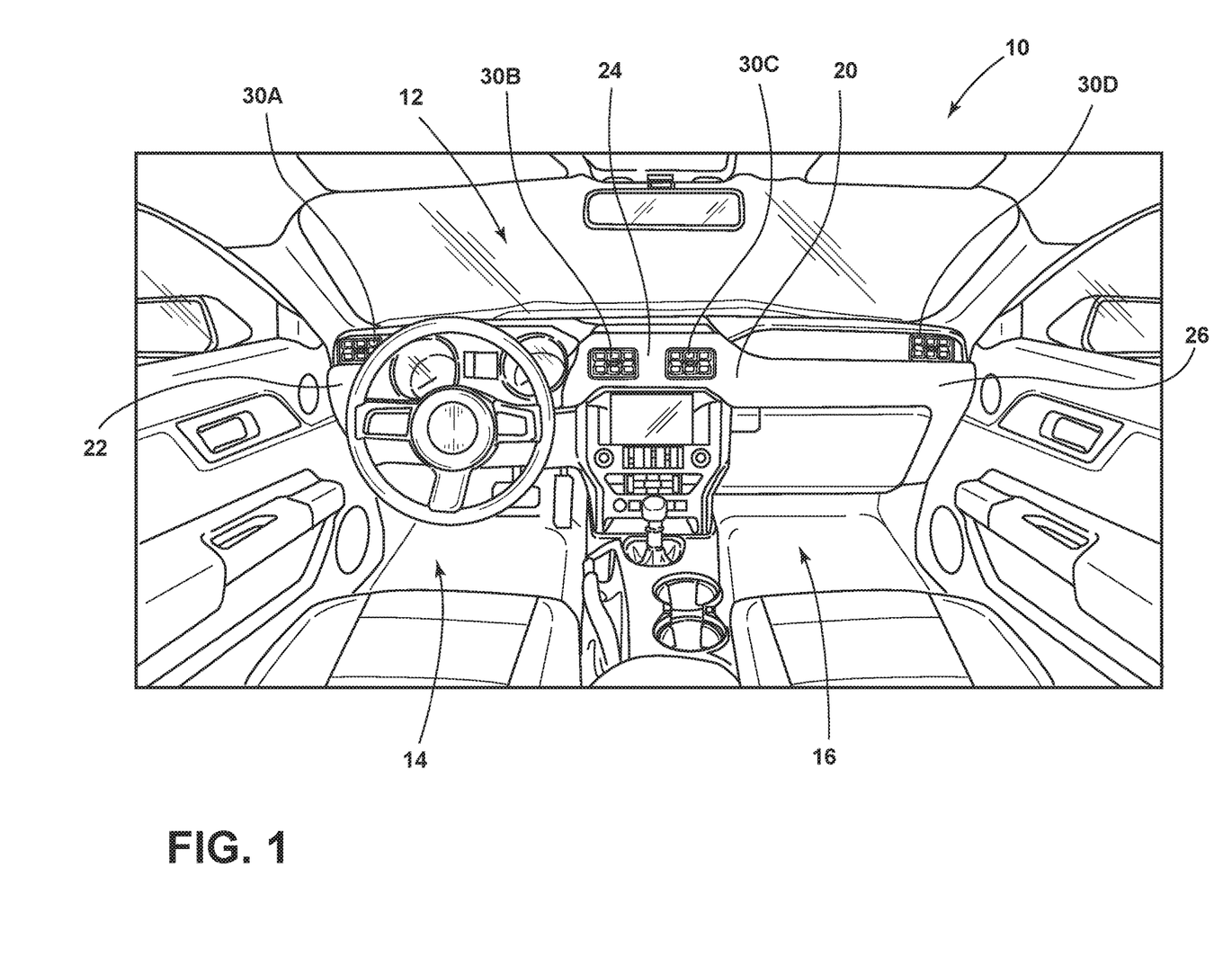
FIG. 1 is a front perspective view of an instrument panel having multiple air registers.

Referring to FIG. 1, a vehicle 10 is shown with an interior cabin 12. The cabin 12 is subdivided into a driver's side region 14 and a passenger's side region 16. Spanning the entire front of the cabin 12 is an instrument panel 20 that may be divided into a driver side portion 22, a center-stack portion 24, and a passenger side portion 26. Each of these portions 22, 24, 26 may serve different functions and include various electrical and mechanical components. Disposed within each of these portions 22, 24, 26 may be air registers 30A-30D, collectively referred to as air registers 30 throughout this disclosure having a number of shared features. These air registers 30 may be distributed throughout the instrument panel 20 to allow for adequate direction of air flow through the vehicle cabin 12. In the present embodiment, the air register 30A is shown disposed in the driver side portion 22, air registers 30B, 30C are disposed within the center-stack portion 24, and air register 30D is shown disposed in the passenger side portion 26. The configuration of air registers 30 shown in FIG. 1 is exemplary only, and it is contemplated that the configuration and dispersal of the air registers 30 across the instrument panel 20, or other regions of the vehicle 10, may be varied depending on the configuration of the vehicle 10 in question.

Referring now to FIGS. 2A and 2B, an air register 30 is shown having a vent housing 32. The air register 30 is shown removed from a vehicle and is an exemplary embodiment of the air registers 30A-30D described above. The vent housing 32 is shown in phantom in FIG. 2A to further illustrate connecting features between the vent housing 32 and other components of the air register 30. The vent housing 32, as shown in FIG. 2A, includes an outlet 34 and an inlet 36 disposed on opposite sides of a body portion 38. The body portion 38 includes first and second portions 42, 44 wherein the first portion 42 is disposed adjacent to the inlet 36 and is smaller than the second portion 44 which is disposed adjacent to the outlet 34. The second portion 44 culminates in a surrounding rim member 48 which defines the parameters of the outlet 34. The first and second portions 42, 44 of the body portion 38 are generally defined by first and second sidewalls 50, 52, which are spaced-apart from one another and interconnected by upper and lower walls 54, 56. Collectively, the rim member 48, the first and second sidewalls 50, 52, and the upper and lower walls 54, 56 define the parameters of the vent housing 32, which in the embodiment of FIG. 2A, is a unitary structure. The vent housing 32 may be made of a polymeric material, such as, for example, a polypropylene composite having a mineral filler. The material used to construct the vent housing 32 may be rigid or flexible to allow for assembly of components of the air register 30 and may be formed using any injection molding technique known in the art. The use of a polymer, such as polypropylene with mineral filler, provides for lower overall production costs as compared to polypropylene without mineral filler, while still providing the necessary rigidity of structural features.

As best shown in FIG. 2B, the rim member 48 includes a perimeter wall 60 having first and second sidewalls 62, 64, which are spaced-apart from one another and interconnected by upper and lower walls 66, 68 to define an open central portion 70 having a configuration defined by an inner surface 72 of the rim member 48. First and second receiving apertures 76, 78 are disposed in the first and second sidewalls 62, 64 respectively, and are used to pivotally couple a frame member 80 to the vent housing 32, as shown in FIG. 2A and as further described below.

Figure 3:
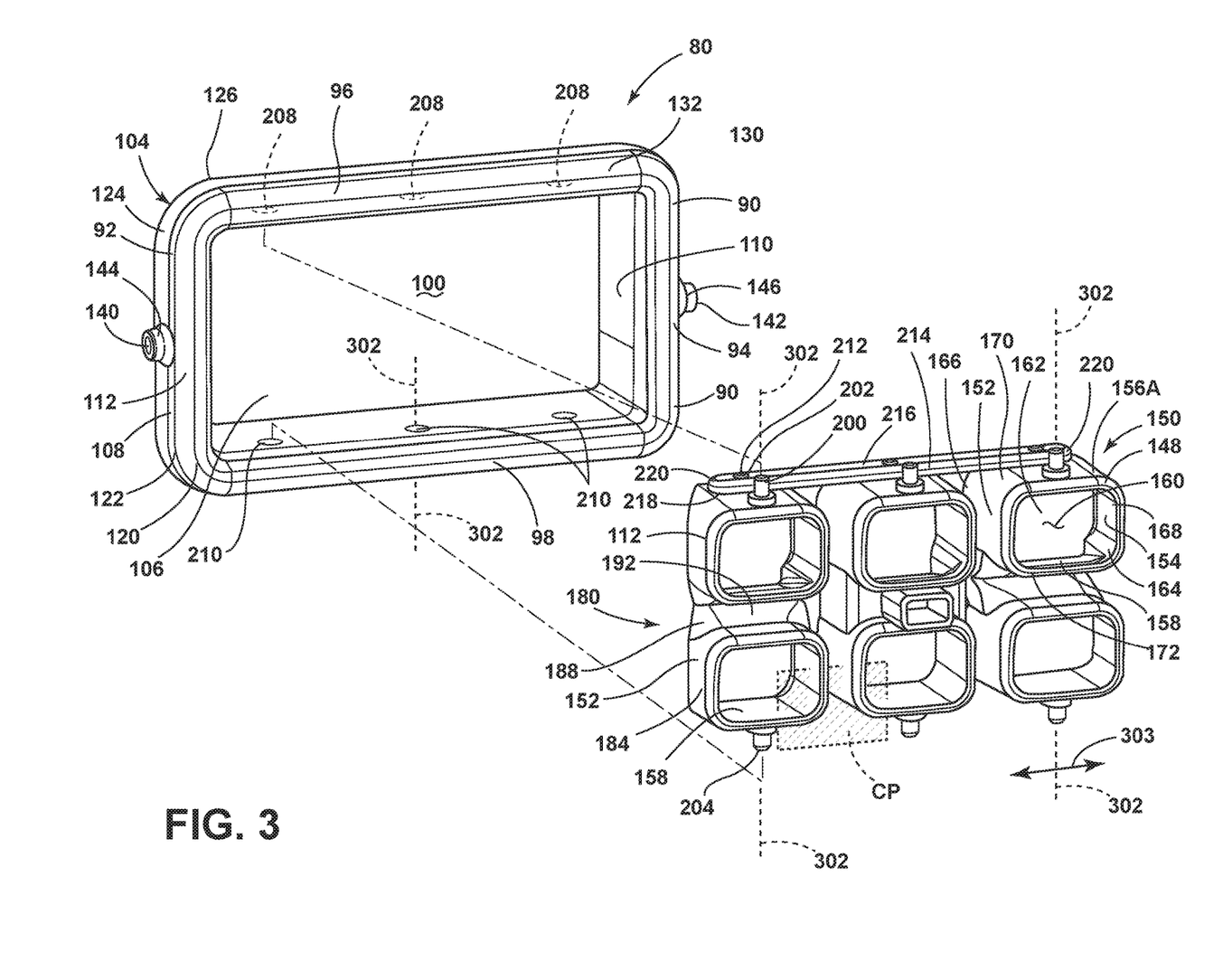
FIG. 3 is an exploded front perspective of the frame member and a multi-chamber set FIG. 2B.

Referring now to FIG. 3, a frame member 80 is shown including a perimeter wall 90 having first and second sidewalls 92, 94 which are spaced-apart from one another and interconnected by upper and lower walls 96, 98 to surround and define an open central portion 100. The open central portion 100 contains an inlet 104 and an outlet 106 separated by a body portion 108 of the perimeter wall 90 of the frame member 80. The body portion 108 includes an inner surface 110 and an exterior surface 112 and may include upper and lower portions. An exterior configuration of the frame member 80 is defined by the exterior surface 112 of the body portion 108 and is complimentary to the configuration of the rim member 48 so that the frame member 80 nests within the second portion 44 of the vent housing 32 at the open central portion 70 of the rim member 48. The exterior surface 112 of the perimeter wall 90 abuts the interior surface 40 of the body portion 38 of the vent housing 32, thereby creating an interface that limits air flow loss around the frame member 80 and directs air flow through the inlet 104 of the frame member 80 and further directs air flow through chambers 150 positioned in the outlet 106 of the frame member 80, as further described below with reference to FIGS. 10 and 11.

Figure 4:
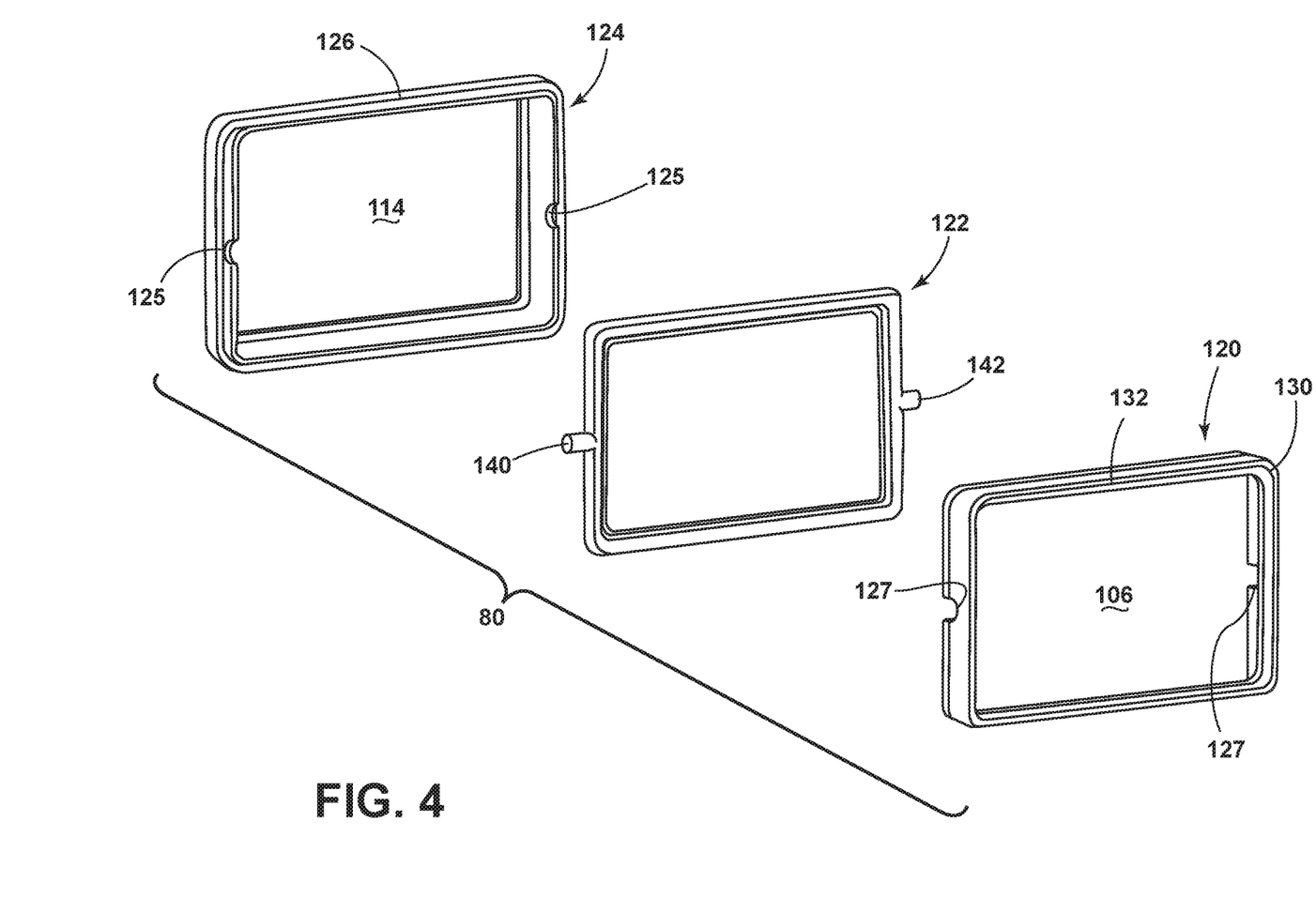
FIG. 4 is an exploded front perspective of the frame member of FIG. 3.

Referring now to FIG. 4, in the embodiment shown, the frame member 80 includes a front portion 120, a retainer 122, and a back portion 124. Alternatively, the retainer 122 and the back portion 124 of the frame member 80 may be combined to form one single piece, or each piece may be formed separately. The front portion 120 and the back portion 124 may be made of a polymeric material, such as, for example, polycarbonate and acrylonitrile butadiene styrene, or any combination thereof. The retainer 122 may be formed from a polymeric material, such as, for example, polyoxymethylene. The materials used to construct the front portion 120, the retainer 122, and the back portion 124 may be rigid or flexible to allow for assembly of components of the air register 30 and may be formed using any injection molding technique known in the art.

Figures 8, 9:
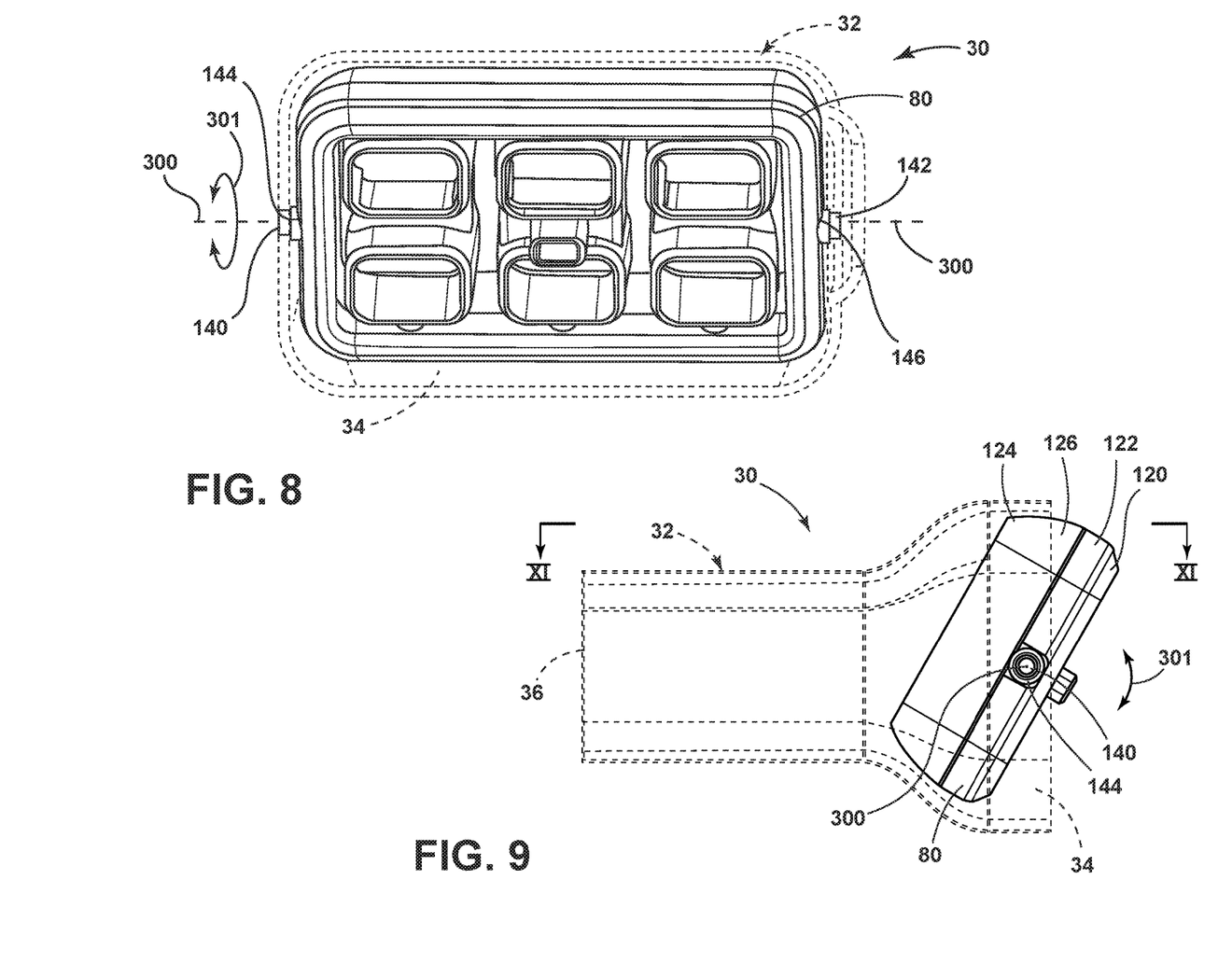
FIG. 8 is a front elevational view of the air register of FIG. 6 with the frame member disposed at downward angle.
FIG. 9 is a side elevational view of the air register of FIG. 8.

As shown in FIGS. 3 and 4, the front portion 120 of the frame member 80 includes a rim 130 disposed around the outlet 106. This rim 130 includes non-linear outer edge 132, which may be beveled, that extends from the front portion 120 to interconnect with the back portion 124. The back portion 124 includes a rearwardly sloping end portion 126, as best shown in FIG. 9, to fit the frame member 80 within the second portion 44 of the vent housing 32. In assembly, the front portion 120 and back portion 124 interconnect by linking notches 125 and 127 with one another around the retainer 122, such that the retainer 122 is positively captured there between to form the assembled frame member 80 (FIG. 3).

Still referring to FIGS. 3 and 4, first and second attachment posts 140, 142 are disposed on the sidewalls 92, 94 of the frame member 80. In the present embodiment, the attachment posts 140, 142 are specifically molded to be part of the retainer 122. However, it is contemplated that, if the back portion 124 and the retainer 122 are a single piece, the attachment posts 140, 142 may extend from the single piece. It is also contemplated that the attachment posts 140, 142 could extend from the back portion 124 of the frame member 80 as well or from any combination of the front portion 120, the retainer 122, or the back portion 124. The first and second attachment posts 140, 142 are received in receiving apertures 76, 78, respectively, on the first and second sidewalls 62, 64 of the vent housing 32. Alternatively, the attachment posts 140, 142 may extend outwardly from the sidewalls 62, 64 of the vent housing 32 and may be received in receiving apertures 76, 78 positioned on the sidewalls 92, 94 of the frame member 80. It is also contemplated that the attachment posts 140, 142 and receiving apertures 76, 78 may be located in any configuration along the perimeter wall 90 of the frame member 80 and the sidewalls 62, 64 of the housing 32, as seen in FIG. 2A. It may also be noted that other attachment mechanisms between the frame member 80 and the vent housing 32 may also be used.

Figures 6, 7:
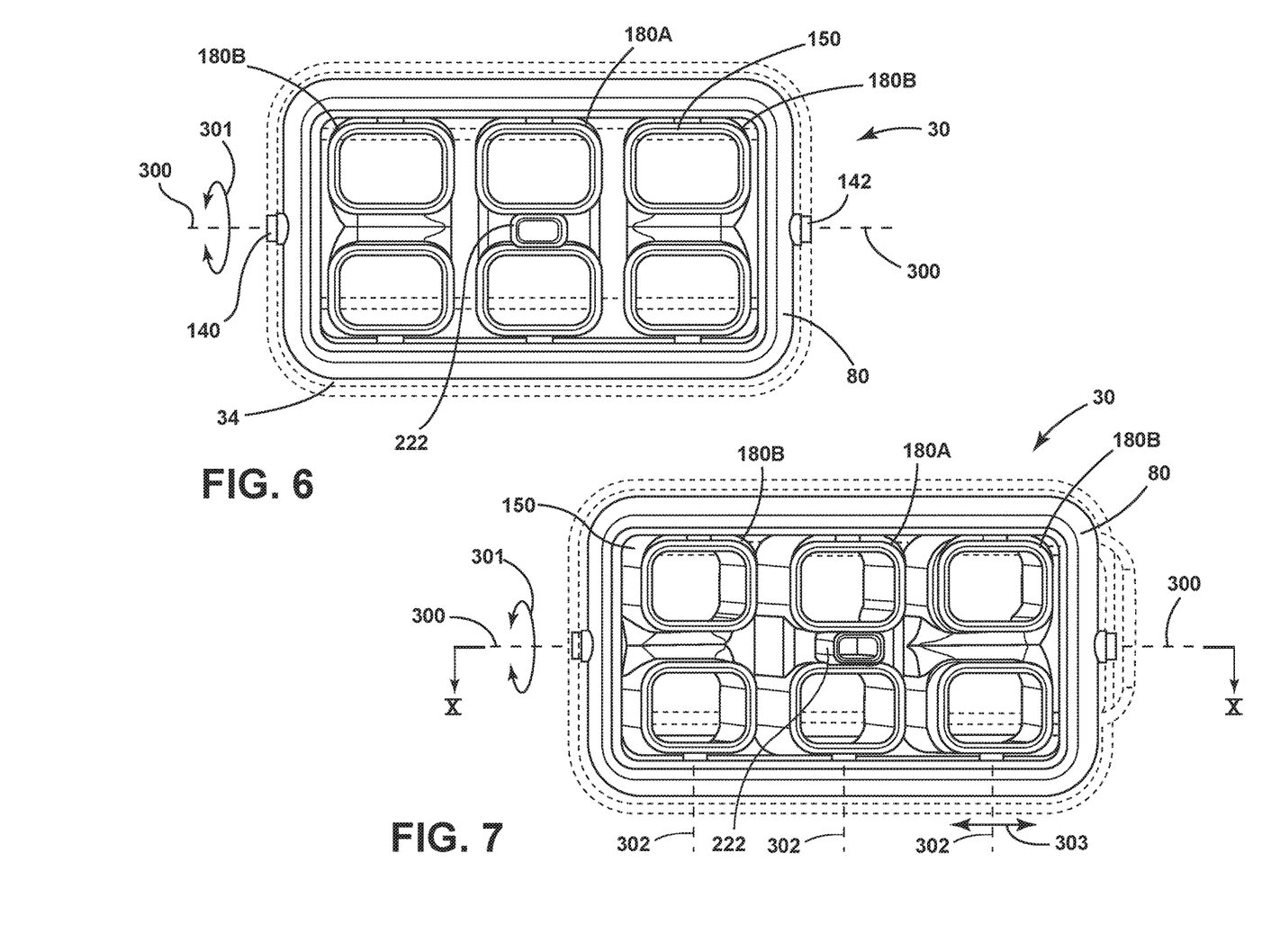
FIG. 6 is a front elevational view of the air register of FIG. 2A.
FIG. 7 is a front elevational view of the air register of FIG. 6 showing a multi-chamber set disposal at an angle.
Figures 10, 11:
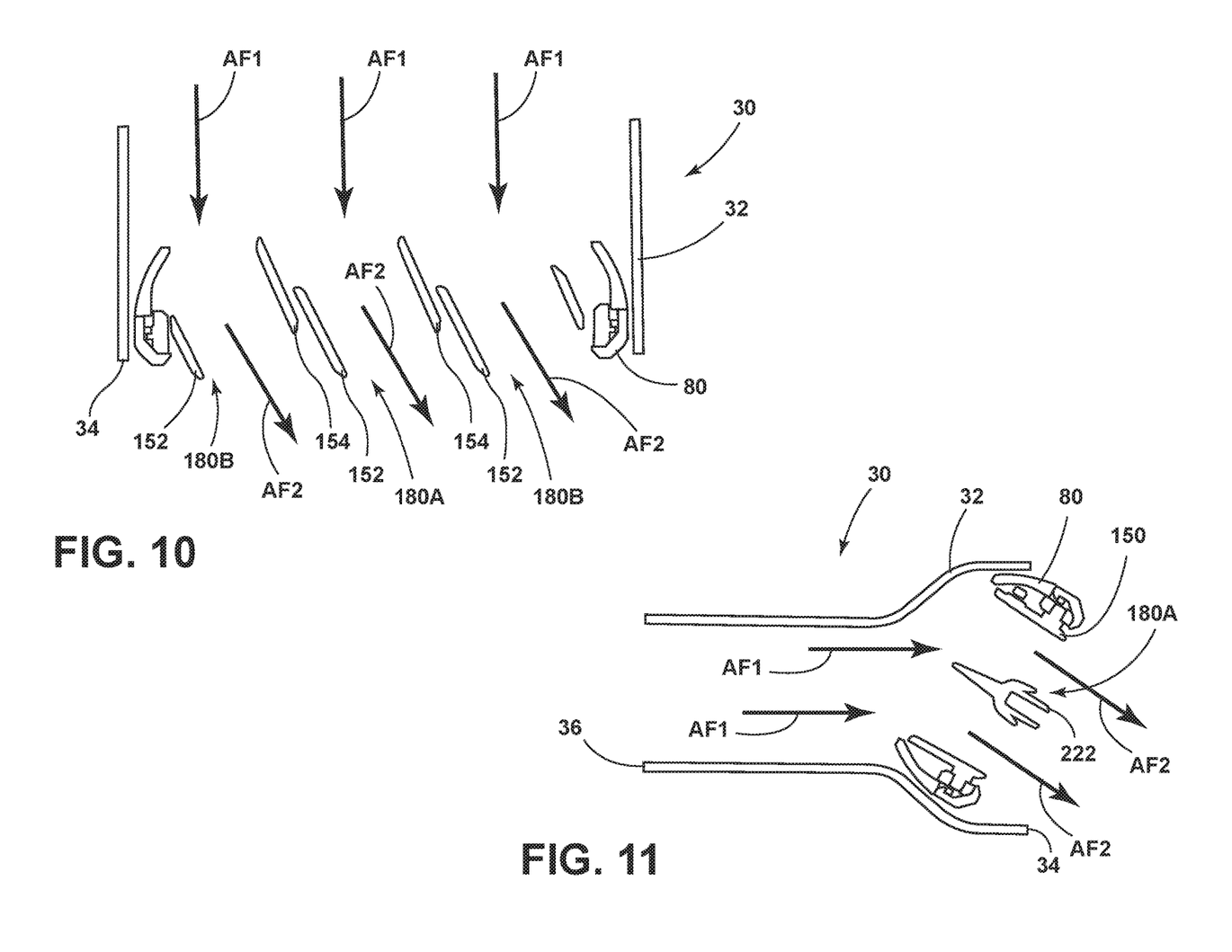
FIG. 10 is a cross-sectional view of the air register of FIG. 7 with indicated air flow paths taken at line X of FIG. 7.
FIG. 11 is a cross-sectional view of the air register of FIG. 9 with indicated air flow paths taken at line XI of FIG. 9.

Referring now to FIGS. 6, 8, and 9 in the present embodiment, the attachment posts 140, 142 of the frame member 80 align to form a first axis 300 that is a rotational axis. As interconnected with the vent housing 32, the frame member 80 pivots or rotates about the first axis 300 between a first position and a second position relative to the outlet 34 to provide movement in a direction indicated by arrow 301, as shown in FIGS. 8 and 9. Mounted to fit around the attachment posts 140, 142 are springs 144, 146 as known in the art. Each spring 144, 146 is made of silicon rubber and generates the effort to maintain the position of the frame member 80 relative to the outlet 34. This movement, and the springs 144, 146 holding the frame member 80 at some position between a first and second positions, allows for directional control of the air flow into the vehicle cabin 12, as shown in FIG. 11.

Referring again to FIG. 3, a plurality of chambers 150 is shown configured to fit within the open central portion 100 of the frame member 80 as defined by the rim 130. Each chamber 150 includes a perimeter wall 148 including first and second sidewalls 152,154 spaced apart by upper and lower walls 156, 158 disposed in a common plane CP around an open interior portion 160. The common plane CP is configured to align with a plane defined by the perimeter wall 90 of the frame member 80. Each chamber 150 contains an inlet 162 and an outlet 164 through which air flows into the cabin 12 of the vehicle 10. The inlet 162 and the outlet 164 are joined by a body portion 166 of the chamber 150 consisting of inner and outer surfaces 168, 170. In the embodiment shown, the inlet 162 and the outlet 164 are of a similar size. However, it is contemplated that the size of the inlet 162 and outlet 164 may not be the same. In the present embodiment, the outlet 164 includes a lip 172 surrounding the outlet 164 and framing the open interior portion 160. The chambers 150 include similar features, such that the description of any one chamber 150 is representative of all chambers, unless otherwise specifically stated.

Figure 5A:
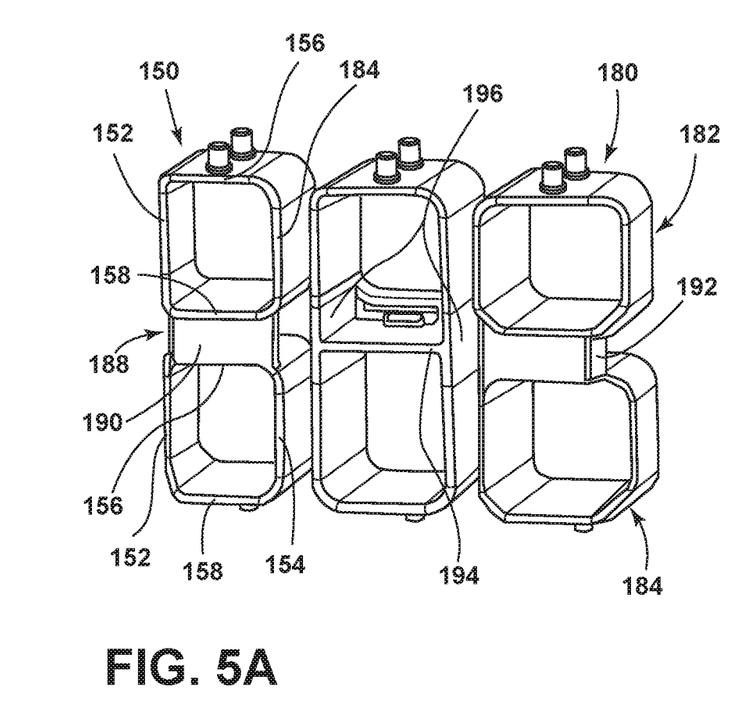
FIG. 5A is a rear perspective view of an embodiment of a multi-chamber set.
Figure 5B:
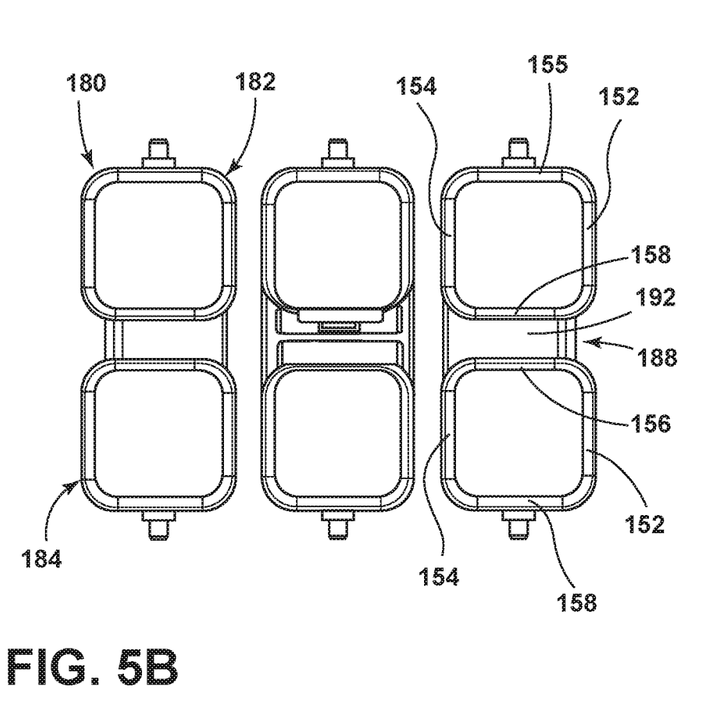
FIG. 5B is a front elevational view of the multi-chamber set of FIG. 5A.

Referring now to FIGS. 5A, and 5B, at least two chambers 150 are combined to form a multi-chamber set 180. Each multi-chamber set 180 contains an upper chamber 182 and a lower chamber 184. The upper and lower chambers 182, 184 are joined by an intermediate portion 188. In the present embodiment three multi-chamber sets 180 are shown positioned next to one another, to provide two outside multi-chamber sets 180 and one middle multi-chamber set 180. More or less chamber sets are also contemplated for use with the present invention. The intermediate portions 188 of the outside multi-chamber sets 180 include a substantially flat back surface 190 oriented perpendicularly to the upper and lower walls 156, 158 of the upper and lower chambers 182, 184 and running the length of the space defined between the lower wall 158 of the upper chamber 182 and upper wall 156 of the lower chamber 184. The intermediate portions 188 also include one or more front surfaces 192 that conjoin at some point when touching the back surface 190 and may be linear, nonlinear, arcuate, or some combination thereof. The intermediate portion 188 of the middle multi-chamber set 180 is configured to form a wedge 194 that directs air movement. The wedge 194 is framed by the sidewalls 152, 154 of the upper and lower chambers 182, 184 to create a singular and uniform flat side surface 196. It is contemplated that the wedged configuration of wedge 194 may be utilized on all multi-chamber sets 180. The chambers 150 may be formed from a polymeric material, such as, for example, polycarbonate/acrylonitrile butadiene styrene, or a combination thereof. The use of such materials combined with the geometry of the chambers provides for reduced cost and weight compared to other materials and configurations, which may be comprised of materials having 30% to 60% glass fiber content. The combination of upright/vertical sidewalls 152, 154 spaced apart and interconnected by substantially horizontal upper and lower surfaces 156, 158 provides the necessary stiffness to allow for replacing current materials with a high flex modulus material in the polycarbonate/acrylonitrile butadiene styrene composition.

Referring again to FIG. 3, each upper chamber 182 includes first and second upper attachment posts 200, 202 extending outwardly from the upper outer surfaces 170 the upper wall 156. The first upper attachment posts 200 of the upper chambers 182 are received in receiving wells 208 disposed within the upper wall 96 of the frame member 80. Each lower chamber 184 also includes attachment posts 204 that extend outwardly from the lower outer surfaces 170 of the lower walls 158 of the lower chambers 184. Each of the lower attachment posts 204 are received in receiving wells 210 disposed within the lower wall 98 of the frame member 80. The first upper attachment posts 200 and the lower attachment posts 204 are aligned on opposite vertical ends of the multi-chamber sets 180 and are configured to facilitate pivotal movement of the multi-chamber sets 180 along second axes 302 between first positions and second positions, as shown in FIGS. 6 and 7. In this embodiment, this configuration provides side-to-side or lateral adjustment 303 of the direction of the air flow, as illustrated in FIG. 10. However, it is also contemplated that the parallel second rotational axes 302 of the multi-chamber sets 180 may be oriented in various ways, depending on the configuration of the air register 30 and the vehicle 10.

Referring still to FIG. 3, the second upper attachment posts 202 are located behind the first upper attachment posts 200 on the upper wall 156 of the upper chamber 182. The second attachment posts 202 are received in receiving wells 212 disposed within a stringer member 214 that is configured to link, or otherwise interconnect, the multi-chamber sets 180 together for synchronized movement therebetween. The stringer member 214 includes upper and lower walls 216, 218, and it may include linear or nonlinear ends 220. The stringer member 214 extends along the upper walls 156 of the upper chambers 182 of the multi-chamber sets 180. The stringer member 214 may be formed of a polymeric material, such as, for example, polyoxymethylene. The materials used to construct the stringer member 214 may be rigid or flexible to allow for assembly of components of the air register 30 and may be formed using any injection molding technique known in the art. The second attachment posts 202 and the stringer member 214 may alternatively be located in a similar position on the lower wall 158 of the lower chamber 184 behind the lower attachment posts 204 in a configuration similar to that of the first and second upper attachment posts 200, 202.

Referring now to FIGS. 6 and 7, an air register 30 is shown comprising a frame member 80 and a plurality of chambers 150. The plurality of chambers 150 comprises multi-chamber sets including a primary multi-chamber set 180A and two secondary multi-chamber sets 180B disposed on opposite sides of the primary multi-chamber vane set. The primary multi-chamber set 180A includes a control member 222 outwardly extending therefrom. The control member 222 may be formed of a polymeric material, such as, for example, polypropylene plus glass fiber. The materials used to construct the control member 222 may be rigid or flexible to allow for assembly of components of the air register 30 and adequate control of the movement of the primary and secondary multi-chamber sets 180A, 180B. The control member 222 controls the movement of the primary multi-chamber set 180A and allows it to pivot between first and second positions along its second axes 302 to provide lateral adjustment as indicated by arrow 303. By means of the stringer member 214, the secondary multi-chamber sets 180B mimic the position of the primary multi-chamber set 180A as it moves between first and second positions. The configuration of the primary multi-chamber set 180A and the secondary multi-chamber sets 180B allows for the pivotal movement of the primary and secondary multi-chamber sets 180A, 180B in unison to limit any air loss between the primary and secondary multi-chamber sets 180A, 180B. Air loss is minimized by keeping the first and second sidewalls 152, 154 of the upper and lower chambers 182, 184 in close proximity to the sidewalls of adjacent multi-chamber sets 180A, 180B. For example, when the plurality of chambers 150 is fully in first position or second position, the outer surfaces of the sidewalls 152, 154 are oriented to be substantially flush with the outer surfaces of the sidewalls 152, 154 of the neighboring chamber 150, as best shown in FIG. 10. It is understood that any sort of handle, knob, wheel, or other control device may be used as the control member 222 to move the multi-chamber sets 180 from first to second position. As noted above, the number of multi-chamber sets 180 may vary to provide the desired control of air flow.

As specifically shown in FIG. 10, a cross-sectional view of FIG. 7 (section X-X), an air register 30 includes a housing 32 and a frame member 80 with a primary multi-chamber set 180A and two secondary multi-chamber sets 180B disposed within the frame member 80. Airflow is indicated by arrows AF1 flowing through the housing 32 and directed towards the multi-chamber sets 180A, 180B. Airflow is further directed along the path indicated by arrows AF2 through the multi-chamber sets 180A, 180B in a side direction. As seen in FIG. 10, the sidewalls 152, 154 of adjacent chambers 150 adjust to sit substantially flush to minimize obstruction of the airflow through the multi-chamber sets 180A, 180B.

Referring now to FIG. 11, a cross-section view of a primary multi-chamber set 180A as positioned as seen in FIG. 9 (section XI-XI), an air register 30 includes a housing 32 and a frame member 80 with primary multi-chamber set 180A and two secondary multi-chamber sets 180B disposed within the frame member 80. Airflow is again indicated by arrows AF1 flowing through the housing 32 and directed towards the multi-chamber sets 180A, 180B. Airflow is further directed along the path indicated by arrows AF2 through the multi-chamber sets 180A, 180B in a downward direction. The direction of arrows AF2 up or down may be controlled by the movement of the frame member 80, which is configured to sit substantially flush with the outlet 34 of the housing 32 to limit air loss around the frame member 80.

To further control air flow through the open multi-chamber sets, there may be a shutter member disposed within the air register that operates to shut off the air flow through the housing before it reaches the multi-chamber sets. This shutter may alternate between an open position and a closed position by means of a mechanism such as, for example, a wheel, knob, or motor. When the shutter is in the closed position, it allows the user to eliminate air flow through the open interior portions of the chambers.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An air register, comprising:
   a vent housing having an outlet;
   a frame member operably coupled to the outlet and having a perimeter wall disposed around an open central portion;
   a plurality of chambers rotatably coupled to the frame member and moveable between first and second positions, wherein the plurality of chambers includes a central pair of chambers spaced apart from the perimeter wall of the frame member and first and second side pairs of chambers, each pair of chambers including an upper chamber and a lower chamber, and further wherein each of the plurality of chambers includes a perimeter wall having vertical and horizontal surfaces disposed through a common plane and defining an open interior portion; and
   a handle member disposed between the upper and lower chambers of the central pair of chambers.

2. The air register of claim 1, wherein the frame member is pivotally coupled to the outlet between first and second positions.

3. The air register of claim 1, wherein the plurality of chambers are disposed within the open central portion of the frame member.

4. The air register of claim 1, wherein the perimeter wall of the frame member includes upper and lower portions.

5. The air register of claim 4, wherein the upper and lower portions of the perimeter wall of the frame member include a plurality of spaced-apart receiving wells.

6. The air register of claim 5, wherein each of the plurality of chambers includes outwardly extending attachment features received in one of the receiving wells disposed on the upper and lower portions of the perimeter wall of the frame member.

7. An air register, comprising:
   a vent housing having an outlet with first and second spaced-apart sidewalls;
   a frame member operably coupled to the first and second sidewalls of the outlet, the frame member having a perimeter wall defining an open central portion, wherein the frame member pivots at least partially within the outlet of the vent housing about a first axis;
   a plurality of chambers disposed within the open central portion and spaced apart from the perimeter wall of the frame member, wherein the plurality of chambers includes a central pair of chambers and first and second side pairs of chambers, each pair of chambers including first and second upper attachment posts extending in a first direction and a lower attachment post aligned with the first upper attachment post and extending in a second direction, the first upper attachment post positioned forward of the second upper attachment post, wherein each pair of chambers is rotatable about the respective first upper attachment post and the lower attachment post, and further wherein each chamber includes a perimeter wall having vertical and horizontal surfaces disposed through a common plane and defining an open interior portion; and
   a handle member disposed on the central pair of chambers and positioned between an upper chamber and a lower chamber of the central pair of chambers.

8. The air register of claim 7, wherein the perimeter wall of the frame member includes first and second sidewalls, an upper wall, and a lower wall, and wherein the vertical surfaces of each chamber are positioned substantially parallel to the first and second sidewalls when each pair of chambers is in a forward facing position.

9. The air register of claim 7, wherein each pair of chambers pivots along an individual axis that is disposed in a perpendicular orientation relative to the first axis of the frame member.

10. The air register of claim 7, including:
a stringer member operably coupled to the second attachment post of each of the plurality of chambers.

11. The air register of claim 7, wherein each pair of chambers is pivotable about an individual axis perpendicular to the first axis.

12. The air register of claim 7, wherein each pair of chambers includes an upper chamber, a lower chamber, and an intermediate portion positioned between the upper chamber and the lower chamber, wherein the intermediate portion forms a wedge configured to direct air movement and at least one of the horizontal surfaces of each of the upper and lower chambers extends along the wedge.

13. An air register, comprising:
a vent housing having an outlet;
a frame member pivotally coupled to the outlet and having upper and lower portions defining an open central portion, wherein the upper portion defines a first receiving well and the lower portion defines a second receiving well, and wherein the frame member is rotatable relative to the vent housing;
a central chamber assembly having an upper chamber including a first upper attachment post received by the first receiving well and a lower chamber including a lower attachment post received by the second receiving well, wherein vertical walls of the upper and lower chambers are spaced apart from a sidewall of the frame member and the chamber assembly is rotatable relative to the frame member, and further wherein the central chamber assembly includes a handle member disposed between the upper and lower chambers of the central chamber assembly; and
first and second side chamber assemblies disposed on opposite sides of the central chamber assembly, wherein the central chamber assembly and the first and second chamber assemblies are defined by perimeter walls having horizontal and vertical surfaces disposed through a common plane.

14. The air register of claim 13, wherein the chamber assembly is one of a plurality of chamber assemblies.

15. The air register of claim 13, wherein the central chamber assembly and the first and second side chamber assemblies are interconnected by a stringer member that is pivotally coupled to second upper attachment posts positioned rearward of at least the first upper attachment post and outwardly extending from each chamber assembly.

16. The air register of claim 14, wherein the frame member rotates at least partially within the outlet along a primary rotational axis between first and second positions, and further wherein each chamber assembly of the plurality of chamber assemblies rotates at least partially within the open central portion of the frame member along a secondary rotational axis that is perpendicular to the primary rotational axis, and further wherein the secondary rotational axes are parallel to one another.

17. The air register of claim 13, wherein the frame member rotates at least partially within the outlet along a primary rotational axis between first and second positions, and further wherein each of the central chamber assembly, the first side chamber assembly, and the second side chamber assembly rotates at least partially within the open central portion of the frame member along an individual secondary rotational axis that is perpendicular to the primary rotational axis, and further wherein the secondary rotational axes are parallel to one another.

* * * * *